United States Patent [19]

Gillemot

[11] 4,084,066

[45] Apr. 11, 1978

[54] RE-ENTERABLE SPLIT SPLICE HOUSING WITH FLEXIBLE LOCKING STRIP

[75] Inventor: George W. Gillemot, Santa Monica, Calif.

[73] Assignee: John T. Thompson, Los Angeles, Calif. ; a part interest

[21] Appl. No.: 733,068

[22] Filed: Oct. 18, 1976

Related U.S. Application Data

[63] Continuation of Ser. No. 580,477, May 23, 1975, abandoned.

[51] Int. Cl.² .......................................... H02G 15/18
[52] U.S. Cl. ..................................... 174/92; 138/156;
    138/158; 174/93; 220/80
[58] Field of Search ....................... 174/91, 92, 93, 76,
    174/138 F; 138/128, 151, 156, 158, 166, 168;
    220/80

[56] References Cited

U.S. PATENT DOCUMENTS

| 3,040,121 | 6/1962 | Gillemot | 174/93 |
| 3,153,693 | 10/1964 | Baxter et al. | 174/93 X |
| 3,512,805 | 5/1970 | Glatz | 138/166 UX |
| 3,771,112 | 11/1973 | Thompson et al. | 174/93 UX |
| 3,781,461 | 12/1973 | Thompson et al. | 174/93 |
| 3,827,704 | 8/1974 | Gillemot et al. | 174/93 X |

FOREIGN PATENT DOCUMENTS

1,953,187   4/1971   Germany ............................. 138/158

*Primary Examiner*—Laramie E. Askin

*Attorney, Agent, or Firm*—Harris, Kern, Wallen & Tinsley

[57] ABSTRACT

A re-enterable enclosure, or enclosure kit, for use with a cable splice, or the like, including, among other elements, a longitudinally split tubular member which is sufficiently flexible and resilient that the edges of the slit thereof may be spread to permit lateral application of the tubular member over a cable splice, or the like, the tubular member having external radial locking ribs respectively extending longitudinally among the edges of the slit therein, and a locking strip of generally H-shaped cross section including two outer flanges and two inner flanges interconnected lengthwise thereof at their respective junctions by a web, the outer flanges respectively having internal longitudinal grooves therein adapted to receive the external locking ribs on the tubular member to prevent spreading of the edges of the slit in the tubular member, the web of the locking strip being insertable longitudinally into the slit in the tubular member from one end of the tubular member with the outer flanges engaging the outer surface of the tubular member on opposite sides of the slit, with the grooves in the outer flanges respectively receiving the locking ribs, and with the inner flanges respectively engaging the inner surface of the tubular member on opposite sides of the slit therein, and the locking strip being materially more flexible than the tubular member so that the inner flanges of the locking strip can be pulled laterally outwardly through the slit in the tubular member with minimum distortion of the tubular member whenever it is desired to remove the locking strip subsequent to longitudinal insertion thereof.

6 Claims, 5 Drawing Figures

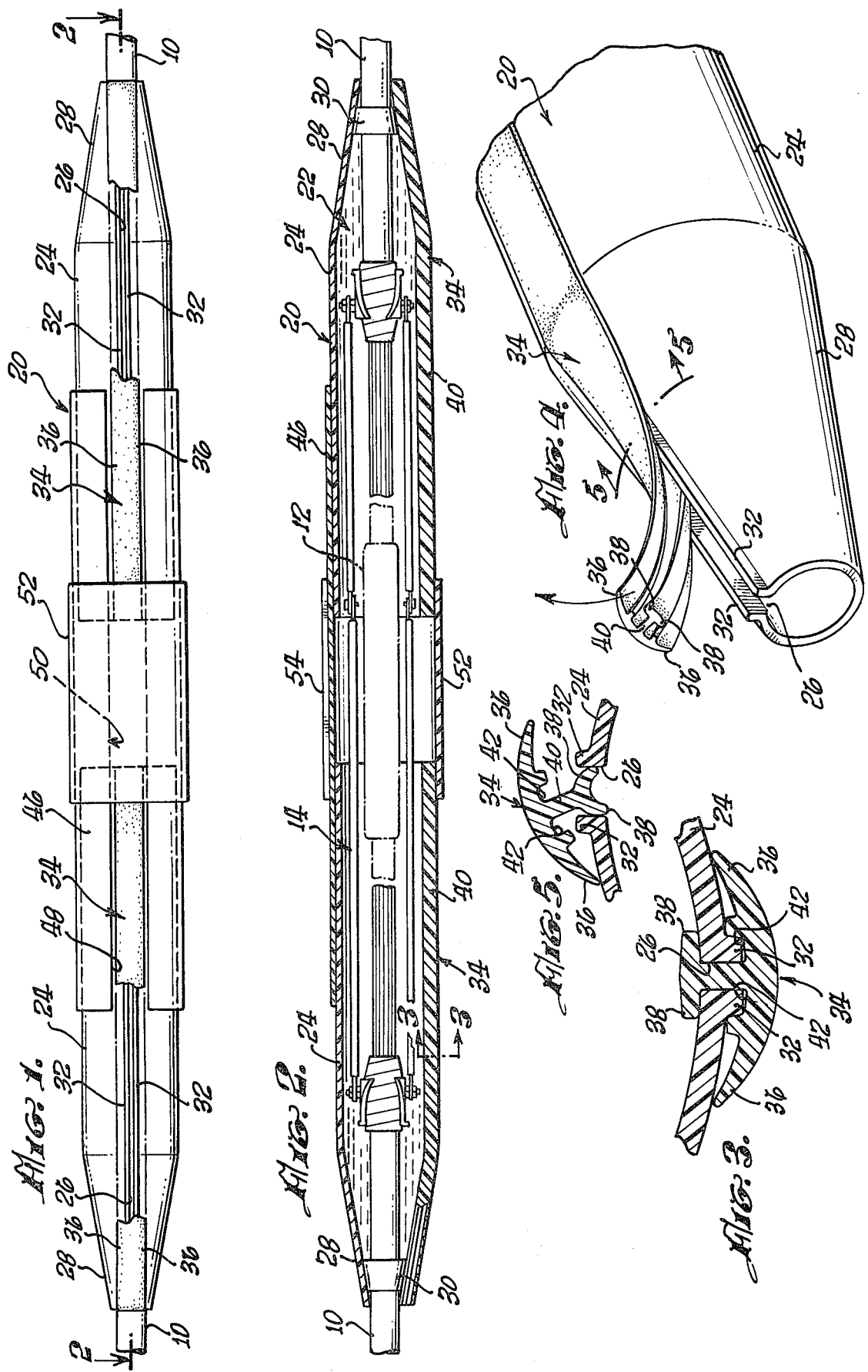

RE-ENTERABLE SPLIT SPLICE HOUSING WITH FLEXIBLE LOCKING STRIP

CROSS-REFERENCE TO RELATED APPLICATIONS

This application is a continuation of application Ser. No. 580,477, filed May 23, 1975, and now abandoned.

BACKGROUND OF THE INVENTION

The present invention relates in general to a re-enterable cable splice enclosure charged with a removable encapsulant or potting compound, and to a kit for making such an enclosure.

Cable splice enclosures which are charged with a splice encapsulating compound occasionally must be re-entered to permit inspection, servicing, repair, or modification, of the enclosed and encapsulated splice. The present invention relates to a cable splice enclosure, and to a kit for making same, which greatly facilitates re-entry for such purposes.

As further background, the invention contemplates a cable installation having a splice between cable ends, and a kit for making such an installation, which includes a re-enterable enclosure housing the spliced cable ends and comprising two axially spaced, longitudinally slit tubular members each having external radial locking ribs respectively extending longitudinally along the edges of the slit therein, a longitudinally slit coupling sleeve telescopically connected to the adjacent ends of the tubular members, two locking strips of generally H-shaped cross section respectively longitudinally telescoped over the locking ribs of the tubular members, each of the locking strips including two outer flanges and two inner flanges interconnected lengthwise at their respective junctions by a web in the slit of the corresponding tubular member, the outer flanges of each of the locking strips being shaped to snugly embrace the radial locking ribs on the corresponding tubular member substantially from end to end thereof and positively preventing expansion of that tubular member, the inner flanges of each of the locking strips engaging the inner surface of the corresponding tubular member on opposite sides of the slit therein, means on the tubular members encircling the cable ends entering the outer ends of the tubular members and closing the outer ends of the tubular members, the locking strips being spaced apart at their inner ends so that the slit in the coupling sleeve forms a potting compound charging port aligned with and located between the spaced inner ends of the locking strips, a charge of potting compound filling the interior of the tubular members and the coupling sleeve and encapsulating the spliced cable ends, and a longitudinally slit closure sleeve embracing the coupling sleeve, the closure sleeve being rotatable about the axis of the coupling sleeve from a position wherein the slit in the closure sleeve registers with the charging port to a position wherein the slit in the closure sleeve is out of register with the charging port.

In the foregoing prior re-enterable cable splice enclosure, the locking strips are installed by sliding them into place longitudinally of the tubular members from the outer ends thereof. When re-entry into the cable splice enclosure is necessary for any reason, these locking strips are removed by sliding them longitudinally outwardly. If the cable splice enclosure is charged with a splice encapsulating or potting compound, such removal of the locking strips may be difficult because of the tendency of the compound to adhere thereto.

OBJECTS AND SUMMARY OF THE INVENTION

With the foregoing background in mind, the primary object of the invention is to provide a cable splice enclosure, and a kit for making same, wherein the locking strips may be removed from the tubular members mentioned quickly and easily without interference by any encapsulating or potting compound within the enclosure.

More particularly, the basic object of the invention is to provide locking strips which are materially more flexible than the tubular members on which they are installed so that they can be pulled or ripped laterally out of their slits in the tubular members, with minimum distortion of such tubular members, and which are formed of a material to which the encapsulating or potting compound within the enclosure will not adhere. A related object is to provide a locking strip of a material which is sufficiently more flexible than the material of its tubular member that the inner flanges of the locking strip will distort enough to permit laterally pulling or ripping the locking strip out of its slit with minimum distortion of the tubular member itself, such tubular member being considerably less flexible than the locking strip.

Materials which have the desired nonadherence characteristics include, among others, polypropylene, polyethylene, polyvinyl chloride, and ethylene ethyl acrylate, polyethylene ethyl vinyl acetate, plasticized polyvinyl chloride, thermal platic rubber, and the like.

The desired flexibility for the locking strips, i.e., a flexibility considerably greater than that of the tubular members in which they are installed, may be achieved by utilizing nonadherent materials, such as those outlined in the preceding paragraph, having a Shore hardness substantially in the range of D17 to D70. Alternatively, such materials may be defined as having a flexural elastic modulus in the range of about 0.01 to about 2.6.

The foregoing objects, advantages, features and results of the present invention, together with various other objects, advantages, features and results which will be evident to those skilled in the art in the light of this disclosure, may be achieved with the exemplary embodiment of the invention illustrated in the accompanying drawing and described in detail hereinafter.

DESCRIPTION OF DRAWING

FIG. 1 is an elevational view of a cable splice enclosure of the invention showing the locking strips in elevation;

FIG. 2 is a longitudinal sectional view taken as indicated by the arrowed line 2—2 of FIG. 1;

FIG. 3 is an enlarged, fragmentary sectional view taken as indicated by the arrowed line 3—3 of FIG. 2 and showing one of the locking strips in place in its slit in the corresponding tubular member;

FIG. 4 is a fragmentary perspective view showing one of the locking strips being pulled or ripped out laterally from its slit in the corresponding tubular member; and FIG. 5 is a fragmentary, transverse sectional view corresponding generally to FIG. 3 and taken as indicated by the arrowed line 5—5 of FIG. 4 and showing one of the locking strips being pulled laterally out of its slit in the corresponding tubular member.

DETAILED DESCRIPTION OF EXEMPLARY EMBODIMENT OF INVENTION

Referring initially to FIG. 2 of the drawing, illustrated therein are aligned cables 10 interconnected by a splice shown diagrammatically at 12. The cables 10 are interconnected by a strap assembly 14 bridging the splice 12.

The foregoing structure, which is conventional and thus need not be described further, is housed within a re-enterable enclosure 20 of the invention which is filled with a charge 22 of a suitable removable potting compound which encapsulates the portions of the cables 10 within the enclosure, the splice 12 and the cable interconnecting assembly 14 to seal same from the elements.

Considering the re-enterable cable splice enclosure 20 of the invention in more detail now, it includes two longitudinally split tubular end members 24, preferably formed of a suitable plastic, which are relatively hard and rigid, but which are still sufficiently flexible that the edges of the slits 26 therein can be spread sufficiently to permit lateral application of the tubular end members to the respective cables 10. The tubular end members 24 have end portions 28 which converge axially away from each other to inside diameters at their extremities substantially equal to the external diameters of the cables 10. Complementary sealing collars 30 provide fluid tight seals between the cables 10 and the convergent end portions 28 of the tubular end members 24 on opposite sides of the splice 12 and interconnecting assembly 14.

External, substantially radial locking ribs 32 respectively extend longitudinally along the edges of the slit 26 in each tubular end member 24, substantially from the outer end of such member to the inner end thereof. The locking ribs 32 on each tubular end member 24 cooperate with a locking strip or slider 34 which constitutes the present invention, as will be explained hereinafter, and which, when installed, prevents circumferential expansion of the corresponding tubular end member.

More particularly, each locking strip 34 has what might be called a generally H-shaped cross sectional configuration and includes two outer flanges 36 and two inner flanges 38 interconnected lengthwise thereof at their respective junctions by a web 40. The inner surfaces of the outer flanges 36 have longitudinal grooves 42 therein adjacent the web 40 to receive the respective locking ribs 32 on the corresponding tubular end member 24. Each locking strip 34 is installed on its corresponding tubular end member 24 by sliding it longitudinally from the outer extremity of the corresponding tubular end member, with the web 40 in the corresponding slit 26, and with the respective outer flanges and inner flanges 36 and 38 positioned as best shown in FIG. 3 of the drawing. As will be apparent, the locking strips 34 prevent circumferential expansion of the tubular end members 24 when thus installed.

Completing a general description of the enclosure 20, it also includes a longitudinally split coupling sleeve 46 formed of a suitable plastic material which is relatively hard and rigid, but nevertheless sufficiently flexible to permit lateral application over one of the cables 10. Upon assembly of the enclosure 20, the ends of the coupling sleeve 46 are telescoped over the inner ends of the tubular end members 24 with the coupling sleeve 46 encompassing the cable splice 12. The longitudinal slit 48 in the coupling sleeve receives the inner ends of the locking strips 34, as best shown in FIG. 1. The inner ends of the locking strips 34 are spaced apart axially a sufficient distance to provide a charging port 50 defined generally by the edges of the slit 48 and the inner ends of the locking strips 34. After the enclosure 20 has been installed around the adjacent ends of the cables 10, the splice 12 and the interconnecting assembly 14, in the field in the manner described, the charge 22 of encapsulating or potting compound may be introduced into the enclosure 20 through the charging port 50. The encapsulating or potting compound is of a type which can be removed when re-entry into the enclosure 20 is necessary for any reason. For example, the compound may be of a type which remains in a gel-like state, or it may be of a type which sets up into a solid state, but which crumbles readily under finger pressure for easy removal.

Finally, the enclosure 20 includes a valve 52 for closing the charging port 50 after encapsulation or potting of the elements within the enclosure. The valve 52 is preferably a longitudinally slit closure sleeve embracing the coupling sleeve 46, and also formed of a suitable plastic which is relatively hard and rigid, but which is sufficiently flexible to permit lateral or axial application to the exterior of the coupling sleeve. When it is desired to charge the interior of the enclosure 20 through the charging port 50, the valve sleeve 52 is rotated into a position such that the slit 54 therein registers with the charging port 50. After charging, the valve sleeve 52 is rotated about the coupling sleeve 46 in a position such that the port in the valve sleeve formed by the slit 54 is circumferentially spaced from the charging port, as shown in FIG. 2 of the drawing. It will be understood that the length of the valve sleeve 52 is sufficient to at least span the length of the charging port 50.

The enclosure 20, as made prior to the present invention, was provided with locking strips 34 formed of a relatively hard and rigid material, similar or identical to the material of which the tubular end members 24, the coupling sleeve 46 and the valve sleeve 52 are formed. With such relatively inflexible locking strips, it is necessary to remove then, when re-entry into the enclosure 20 is desired for any reason, by pulling them longitudinally of the tubular end members 24 in axially outward directions. Sometimes, removing the locking strips 34 by sliding them longitudinally out of their respective slits 26 is difficult, if not impossible, because of adherence of the encapsulating or potting charge 22 thereto.

The present invention overcomes the foregoing problem by making the locking strips 34 of a material which is considerably more flexible than the tubular end members 24 on which they are installed so that they can be pulled or ripped laterally out of their slits in the tubular members, with minimum distortion of such tubular members, as suggested in FIGS. 4 and 5 of the drawing. (In these figures, one of the locking strips or sliders 34 is shown as being ripped out laterally with a twisting motion imparted thereto for convenience of illustration, but this is not essential.) Further, the locking strips 34 are formed of a material to which the charge 22 of encapsulating or potting compound within the enclosure 20 will not adhere, thereby greatly facilitating lateral pulling or ripping out of the locking strips. Thus, the present invention makes removal of the locking strips 34 for the purposes of re-entry into the enclosure 20 a very simple matter, something which is not true of rigid locking strips which must be pulled out longitudinally, and which tend to adhere to the potting or encapsulating charge.

Examples of suitable nonadherent materials, and examples of hardnesses providing the desired flexibility, have been provided earlier herein, and will not be repeated at this stage.

It will be understood that the present invention may be regarded as either a completed assembly as shown in the drawing, or as a kit comprising the various parts needed to make up the complete assembly in the field.

Although an exemplary embodiment of the invention has been disclosed for purposes of illustration, it will be understood that various changes, modifications and substitutions may be incorporated in such embodiment without departing from the invention as hereinafter claimed.

I claim as my invention:

1. In an enclosure kit for use with a cable splice, or the like, the combination of:
   a. a longitudinally slit tubular member having external radial locking ribs respectively extending longitudinally along the edges of the slit therein; and
   b. a locking strip of generally H-shaped cross section including two outer flanges and two inner flanges interconnected lengthwise thereof at their respective junctions by a web, said outer flanges respectively having internal longitudinal grooves therein adapted to receive said external locking ribs on said tubular member, said web of said locking strip being insertable longitudinally into said slit in said tubular member from one end of said tubular member with said outer flanges engaging the outer surface of said tubular member on opposite sides of said slit, with said grooves in said outer flanges respectively receiving said locking ribs, and with said inner flanges respectively engaging the inner surface of said tubular member on opposite sides of said slit therein, and said locking strip being materially more flexible than said tubular member so that said inner flanges of said locking strip can be pulled laterally outwardly through said slit in said tubular member with minimum distortion of said tubular member whenever it is desired to remove said said locking strip subsequent to longitudinal insertion thereof, said inner flanges being narrower than said outer flanges so that they can be pulled laterally outwardly through said slit readily.

2. A kit as defined in claim 1 wherein the Shore hardness of said locking strip is in the range of D17 to D70 to provide the necessary flexibility.

3. A kit as set forth in claim 1 wherein said tubular member is sufficiently flexible and resilient that the edges of the slit thereof may be spread to permit lateral application of the tubular member over a cable splice, or the like.

4. A cable installation having a splice between cable ends, including a re-enterable enclosure housing the spliced cable ends and comprising two axially spaced, longitudinally slit tubular members each having external radial locking ribs respectively extending longitudinally along the edges of the slit therein, a longitudinally slit coupling sleeve telescopically connected to the adjacent ends of said tubular members, two locking strips of generally H-shaped cross section respectively longitudinally telescoped over said locking ribs of said tubular members, each of said locking strips including two outer flanges and two inner flanges interconnected lengthwise at their respective junctions by a web in said slit of the corresponding tubular member, said outer flanges of each of said locking strips being shaped to snugly embrace said radial locking ribs on the corresponding tubular member substantially from end to end thereof and positively preventing expansion of that tubular member, said inner flanges of each of said locking strips engaging the inner surface of the corresponding tubular member on opposite sides of said slit therein, said locking strips being more flexible than said tubular members so that said inner flanges of said locking strips can be pulled laterally outwardly through said slits in said tubular members with minimum distortion of said tubular members, said inner flanges of said locking strips being narrower than said outer flanges thereof so that said inner flanges can be pulled laterally outwardly through said slits in said tubular members readily, means on said tubular members encircling the cable ends entering the outer ends of said tubular members and closing said outer ends of said tubular members, said locking strips being spaced apart at their inner ends so that said slit in said coupling sleeve forms a potting compound charging port aligned with and located between the spaced inner ends of said locking strips, a charge of potting compound filling the interior of said tubular members and said coupling sleeve and encapsulating the spliced cable ends, and a longitudinally slit closure sleeve embracing said coupling sleeve, said closure sleeve being rotatable about the axis of said coupling sleeve from a position wherein said slit in said closure sleeve registers with said charging port to a position wherein said slit in said closure sleeve is out of register with said charging port, said locking strips being formed of a material which will not adhere to said potting compound.

5. An enclosure kit for spliced ends of cables, or the like, comprising two longitudinally slit tubular members having tapered outer ends and cylindrical inner ends, a longitudinally slit coupling sleeve the ends of which are respectively telescopically connectible to said inner ends of said tubular members with said inner ends of said tubular members in axially spaced relation, a longitudinally slit closure sleeve telescopable over said coupling sleeve, and two generally H-shaped locking strips slidably insertable into the slits in said tubular members from the outer ends thereof substantially to the inner ends thereof, said tubular members, said coupling sleeve and said closure sleeve being sufficiently flexible and resilient so that the edges of the slits thereof may be spread to permit lateral insertion of the cable splice, said closure sleeve subsequently being telescopable over said coupling sleeve, and said inner ends of said tubular members subsequently being telescopically connectible to said ends of said coupling sleeve, and said locking strips subsequently being insertable longitudinally into said slits in said tubular members from the outer ends of said tubular members substantially to said inner ends thereof, the edges of said slits in said tubular members and said locking strips having cooperable means thereon for preventing lateral spreading of the edges of said slits in said tubular members after longitudinal insertion of said locking strips thereinto, said locking strips having inner and outer flanges and being more flexible than said tubular members so that said inner flanges of said locking strips can be pulled laterally outwardly through said slits in said tubular members with minimum distortion of said tubular members, said inner flanges of said locking strips being narrower than said outer flanges thereof so that said inner flanges can be pulled laterally outwardly through said slits in said members readily, the lengths of said locking strips being such that the inner ends thereof are spaced apart sufficiently that said slit in said coupling sleeve forms between said inner ends of said locking strips a charging port for a potting compound upon assembly of said tubular members, coupling sleeves and locking strips, said closure sleeve being rotatable relative to said coupling sleeve so that said charging port is open when said slit in said coupling sleeve registers therewith, and is closed when said slit in said closure sleeve is out of register therewith, and a charge of potting compound introducible into said charging port when open and in a quantity sufficient to encapsulate the spliced cable ends, said locking strips being formed of a material which will not adhere to said potting compound.

6. An enclosure kit for spliced ends of cables, or the like, comprising two longitudinally slit tubular members having tapered outer ends and cylindrical inner ends, a longitudinally slit coupling sleeve the ends of which are respectively telescopically connectible to said inner ends of said tubular members with said inner ends of said tubular members in axially spaced relation, and two generally H-shaped locking strips slidably insertable into the slits in said tubular members from the outer ends thereof substantially to the inner ends thereof, said tubular members and said coupling sleeve being sufficiently flexible and resilient so that the edges of the slits thereof may be spread to permit lateral insertion of the cable splice, said inner ends of said tubular members subsequently being telescopically connectible to said ends of said coupling sleeve, and said locking strips subsequently being insertable longitudinally into said slits in said tubular members from the outer ends of said tubular members substantially to said inner ends thereof, the edges of said slits in said tubular members and said locking strips having coperable means thereon for preventing lateral spreading of the edges of said slits in said tubular members after longitudinal insertion of said locking strips thereinto, said locking strips having inner and outer flanges and being more flexible than said tubular members so that said inner flanges of said locking strips can be pulled laterally outwardly through said slits in said tubular members with minimum distortion of said tubular members, said inner flanges of said locking strips being narrower than said outer flanges thereof so that said inner flanges can be pulled laterally outwardly through said slits in said tubular members readily, the lengths of said locking strips being such that the inner ends thereof are spaced apart sufficiently that said slit in said coupling sleeve forms between said inner ends of said locking strips a charging port for a potting compound upon assembly of said tubular members, coupling sleeve and locking strips, and a charge of potting compound introducible into said charging port in a quantity sufficient to encapsulate the spliced cable ends, said locking strips being formed of a material which will not adhere to said potting compound.

* * * * *